(12) United States Patent
Nakamura

(10) Patent No.: US 12,360,920 B2
(45) Date of Patent: Jul. 15, 2025

(54) INFORMATION PROCESSING DEVICE AND INFORMATION PROCESSING METHOD WITH LOCK FOR EXCLUSIVE ACCESS TO DATA IN MEMORY

(71) Applicant: Sony Group Corporation, Tokyo (JP)

(72) Inventor: Yuuichi Nakamura, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 18/293,858

(22) PCT Filed: Mar. 4, 2022

(86) PCT No.: PCT/JP2022/009370
§ 371 (c)(1),
(2) Date: Jan. 31, 2024

(87) PCT Pub. No.: WO2023/037595
PCT Pub. Date: Mar. 16, 2023

(65) Prior Publication Data
US 2024/0345966 A1 Oct. 17, 2024

(30) Foreign Application Priority Data
Sep. 7, 2021 (JP) ................. 2021-145665

(51) Int. Cl.
*G06F 12/14* (2006.01)
*G06F 12/0871* (2016.01)

(52) U.S. Cl.
CPC ...... *G06F 12/1466* (2013.01); *G06F 12/0871* (2013.01); *G06F 2212/1052* (2013.01)

(58) Field of Classification Search
CPC ............ G06F 12/0808; G06F 12/0815; G06F 12/0871; G06F 12/1466; G06F 2212/1052; Y02D 10/00
See application file for complete search history.

(56) References Cited

U.S. PATENT DOCUMENTS

| 6,745,294 B1* | 6/2004 | Wilson | G06F 12/0808 |
| | | | 711/E12.04 |
| 2009/0119459 A1* | 5/2009 | Akkary | G06F 9/3004 |
| | | | 711/E12.016 |
| 2019/0012270 A1* | 1/2019 | Imazaki | G06F 12/0804 |

FOREIGN PATENT DOCUMENTS

| JP | H07262089 A | 10/1995 |
| JP | 2006276901 A | 10/2006 |

(Continued)

OTHER PUBLICATIONS

International Search Report (PCT/ISA/210), International Application No. PCT/JP2022/009370, dated Apr. 19, 2022.

*Primary Examiner* — Aracelis Ruiz

(74) *Attorney, Agent, or Firm* — Michael Best & Friedrich LLP

(57) ABSTRACT

An information processing device (100) includes a plurality of CPUs (1), a plurality of cache memories (2) associated with the plurality of CPUs (1), and a main memory (3), each of the plurality of CPUs (1) acquires a lock for exclusively accessing data in the main memory (3), and then accesses the data, data related to access of a corresponding CPU (1) and a lock ID for specifying the lock related to the access are associated and written in a cache line of each of the plurality of cache memories (2), and a cache line of each of the plurality of cache memories (2) is flushed when a CPU (1) other than the corresponding CPU (1) acquires the lock specified based on the lock ID written in the cache line.

19 Claims, 15 Drawing Sheets

(56) References Cited

FOREIGN PATENT DOCUMENTS

| | | |
|---|---|---|
| JP | 2007011580 A | 1/2007 |
| WO | 2008155844 A1 | 12/2008 |

* cited by examiner

INFORMATION PROCESSING DEVICE AND INFORMATION PROCESSING METHOD WITH LOCK FOR EXCLUSIVE ACCESS TO DATA IN MEMORY

FIELD

The present disclosure relates to an information processing device and an information processing method.

BACKGROUND

As described in, for example, Patent Literature 1 and Patent Literature 2, there are known techniques that a plurality of CPUs access the same memory and perform data processing to improve a processing speed.

CITATION LIST

Patent Literature

Patent Literature 1: JP 2007-11580 A
Patent Literature 2: WO 2008/155844 A

SUMMARY

Technical Problem

It is required to maintain coherency (cache coherency) between cache memories of respective CPUs. Although, for example, there is also a technique that a snooping unit monitors data access of each CPU, there remains a problem in terms of a monitoring load, power consumption accompanying this, and the like. There is still a demand for techniques for maintaining cache coherency.

One aspect of the present disclosure makes it possible to maintain cache coherency.

Solution to Problem

An information processing device according to one aspect of the present disclosure includes: a plurality of CPUs; a plurality of cache memories associated with the plurality of CPUs; and a main memory, wherein each of the plurality of CPUs acquires a lock for exclusively accessing data in the main memory, and then accesses the data, data related to the access of a corresponding CPU and a lock ID for specifying the lock related to the access are associated and written in a cache line of each of the plurality of cache memories, and the cache line of each of the plurality of cache memories is flushed when a CPU other than the corresponding CPU acquires the lock specified based on the lock ID written in the cache line.

An information processing method according to one aspect of the present disclosure includes: at each of a plurality of CPUs, acquiring a lock for exclusively accessing data in a main memory, and then accessing the data; associating and writing data related to the access of a corresponding CPU and a lock ID for specifying the lock related to the access in a cache line of each of a plurality of cache memories associated with the plurality of CPUs; and flushing the cache line of each of the plurality of cache memories when a CPU other than the corresponding CPU acquires the lock specified based on the lock ID written in the cache line.

DESCRIPTION OF EMBODIMENTS

Figure 1:
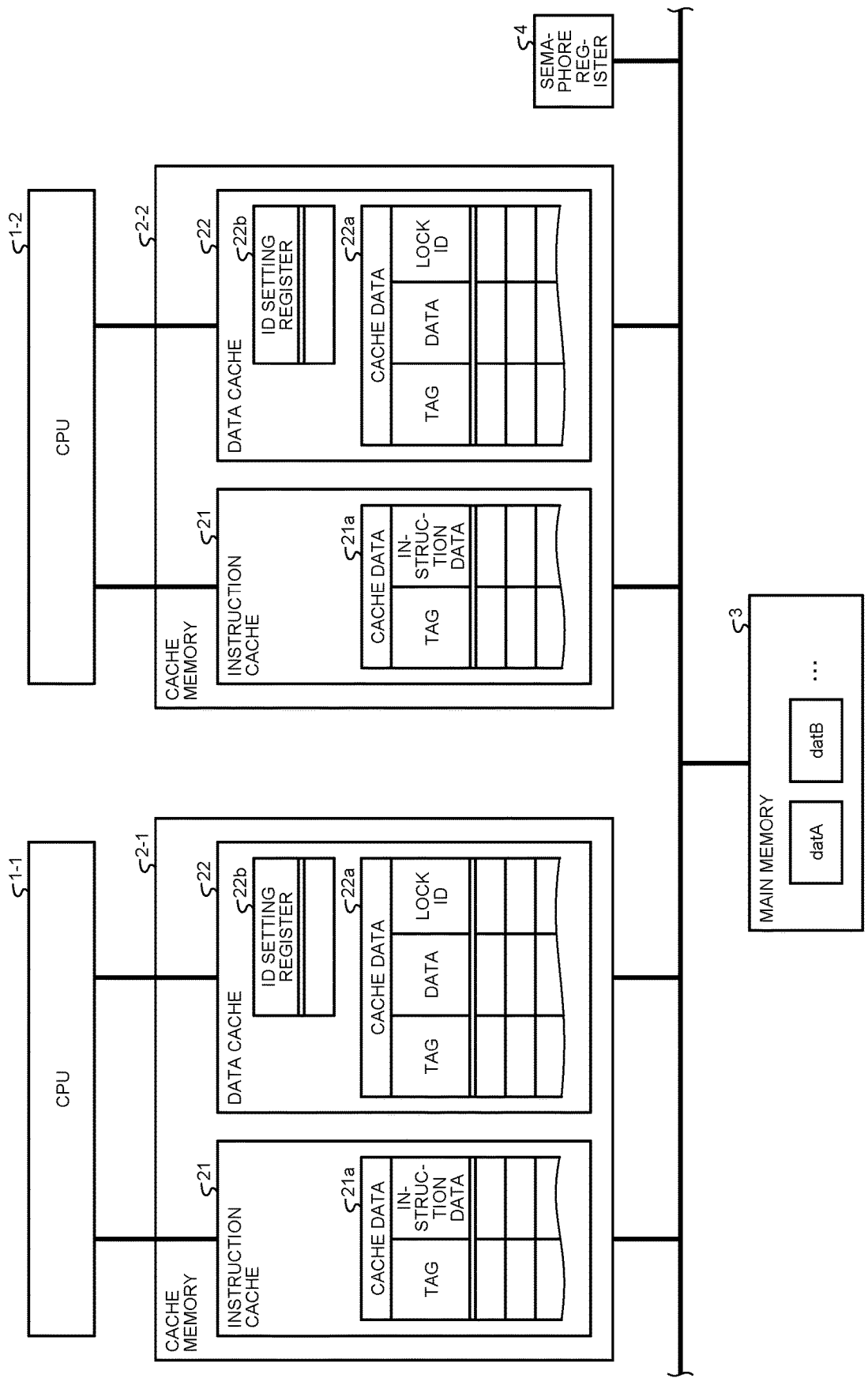
FIG. 1 is a view illustrating an example of a schematic configuration of an information processing device according to an embodiment.

Hereinafter, an embodiment of the present disclosure will be described in detail with reference to the drawings. Note that the same components will be assigned the same reference numerals, and redundant description will be omitted in each following embodiment.

Furthermore, the present disclosure will be described in order of items described below.

1. Embodiment
2. Modified Example
2.1 First Modified Example
2.2 Second Modified Example
2.3 Others
3. Example of Effect

1. Embodiment

FIG. 1 is a view illustrating an example of a schematic configuration of an information processing device according to the embodiment. An information processing device 100 includes a plurality of CPUs 1, a plurality of cache memories 2 associated with the plurality of CPUs 1, a main memory 3, and a semaphore register 4.

The plurality of CPUs 1 each access data in the main memory 3. It can also be said that the plurality of CPUs 1 share (commonly use) the main memory 3. The CPU 1 executes data processing and the like by operating according to a program (software). The plurality of CPUs 1 process the same data in parallel to improve a processing speed. Data may be also understood to mean a data structure, and the data may be read as appropriate as a data structure within a range without contradiction. FIG. 1 illustrates the two CPUs 1 as the plurality of CPUs 1. The CPUs 1 are referred to as a CPU 1-1 and a CPU 1-2 to enable distinction of each CPU 1.

Each of the plurality of cache memories 2 is associated with each of the plurality of CPUs 1. The cache memory 2 that is associated with associated with the CPU 1-1 and that the CPU 1-1 makes data access to is referred to and illustrated as a cache memory 2-1. The cache memory 2 that is associated with the CPU 1-2 and the CPU 1-2 makes data access to is referred to and illustrated as a cache memory 2-2. It can also be said that the CPU 1 includes (uses) the corresponding cache memory 2. A data access speed of the CPU 1 to the cache memory 2 is faster than a data access speed of the CPU 1 to the main memory 3.

Note that the information processing device 100 in which each of the plurality of CPUs 1 includes the cache memory 2 and shares the main memory 3 as described above and that processes data in the main memory 3 in parallel is also referred to as a Symmetric Multiprocessing (SMP) system or the like.

The cache memory 2 holds data related to access of the corresponding CPU 1 to the main memory 3. The data related to the access includes data read from the main memory 3 as a result of the access. The data related to the access may be also understood to mean data processed (e.g., rewritten) by the CPU 1 after being read. In the example illustrated in FIG. 1, the cache memory 2 includes an instruction cache 21 and a data cache 22.

The instruction cache 21 internally holds instructions for the CPU 1. The instruction is sometimes read from the main memory 3, but is not rewritten or overwritten in the main memory 3.

Data in the instruction cache 21 is referred to and illustrated as cache data 21a. In response to data access of the corresponding CPU 1 to the main memory 3, a tag related to the access and instruction data related to the access are associated and written in a cache line of the cache data 21a. The tag related to the access includes information (e.g., an address value) of an address or the like in the accessed main memory 3.

The data cache 22 internally holds data that can be a processing target of the CPU 1. The data is not only read from the main memory 3, but also rewritten or overwritten in the main memory 3.

Data in the data cache 22 is referred to and illustrated as cache data 22a. In response to data access of the corresponding CPU 1 to the main memory 3, a tag related to the access, data related to the access, and a lock ID for specifying a lock related to the access are associated and written in a cache line of the cache data 22a. The lock related to access is a lock acquired for making access. Details of the lock and the lock ID will be described later.

The data cache 22 includes an ID setting register 22b. A lock ID is set to (a value is written in) the ID setting register 22b. The lock ID set to the ID setting register 22b is written in the cache line of the cache data 22a of the same cache memory 2 (the cache memory 2 including this ID setting register 22b) together with the tag and the data related to the access.

The main memory 3 is a Random Access Memory (RAM) provided for the plurality of CPUs 1. Note that FIG. 1 illustrates data datA and data datB as data that can be a processing target of the CPU 1 among data stored in the main memory 3.

The semaphore register 4 performs exclusive control by a semaphore. The semaphore register 4 provides a lock for the CPU 1 to exclusively access data in the main memory 3. The lock is provided for each access to lock target data such as access to the data datA and access to the data datB. The above-described lock ID is identification information for specifying a lock. The lock ID is determined based on a lock number (e.g., semaphore number) provided together with the lock. The lock number is, for example, a memory address value at which the lock exists. The lock ID may be the same as or different from the lock number.

The semaphore register 4 is an example of an exclusive control mechanism. Various other exclusive control mechanisms other than the semaphore register 4 may be used. Another example of the exclusive control mechanism is an exclusive control mechanism configured to perform exclusive control by spin lock, exclusive control by mutex, and the like.

The CPU 1 acquires a lock from the semaphore register 4, and then accesses data in the main memory 3. A lock ID for specifying a lock of the access is set to the ID setting register 22b of the cache memory 2 associated with the CPU 1 that has made data access. Only the CPU 1 that has acquired the lock can access lock target data.

After completing the data access, the CPU 1 releases the acquired lock. The lock ID set to the ID setting register 22b of the cache memory 2 associated with the CPU 1 is erased (a value is cleared). The arbitrary CPU 1 can acquire the released lock and access this lock target data.

Each of the plurality of CPUs 1 includes the cache memory 2 and shares the main memory 3, and therefore there is a problem of lack of cache coherency. For example, when the CPU 1-1 accesses the data datA in the main memory 3, the data datA is written in the cache line of the cache memory 2-1. Subsequent access of the CPU 1-1 to the data datA is made not to the data datA in the main memory 3, but to the data datA written in the cache line of the cache memory 2-1.

Even when the CPU 1-2 rewrites the data datA in the main memory 3, the data datA written in the cache line of the cache memory 2-1 is not rewritten. The CPU 1-1 still accesses the data datA (the data datA before rewriting) written in the cache line of the cache memory 2-1.

To avoid such lack of cache coherency and maintain cache coherency, it is necessary to flush data written in the cache line. Flush may be also understood to mean erasing of data written in a cache line and overwriting (writeback) of this data in the main memory 3.

In the information processing device 100 according to the embodiment, the lock ID is written in the cache line of the data cache 22 of the cache memory 2 as described above. The cache line is flushed using the written lock ID. More specifically, the cache line of the data cache 22 of each of the plurality of cache memories 2 is flushed when the CPU 1 other than the corresponding CPU 1 acquires a lock specified based on the lock ID written in the cache line.

For example, a flush instruction for giving an instruction on flushing of the cache line in which a lock ID associated with the lock ID of the lock acquired by the CPU 1 has been written is transmitted to the CPU 1 other than the CPU 1 that has acquired the lock. An example of the corresponding lock ID is the same lock ID. Another example of the corresponding lock ID is an overlapping lock ID of at least part of locks among a plurality of specified locks, and will be described later with reference to FIG. 16. The CPU 1 that has received the flush instruction flushes the cache line in which the corresponding lock ID has been written among the cache lines of the data cache 22 of the corresponding cache memory 2. This will be more specifically described with reference to FIGS. 2 to 9.

Figure 2:
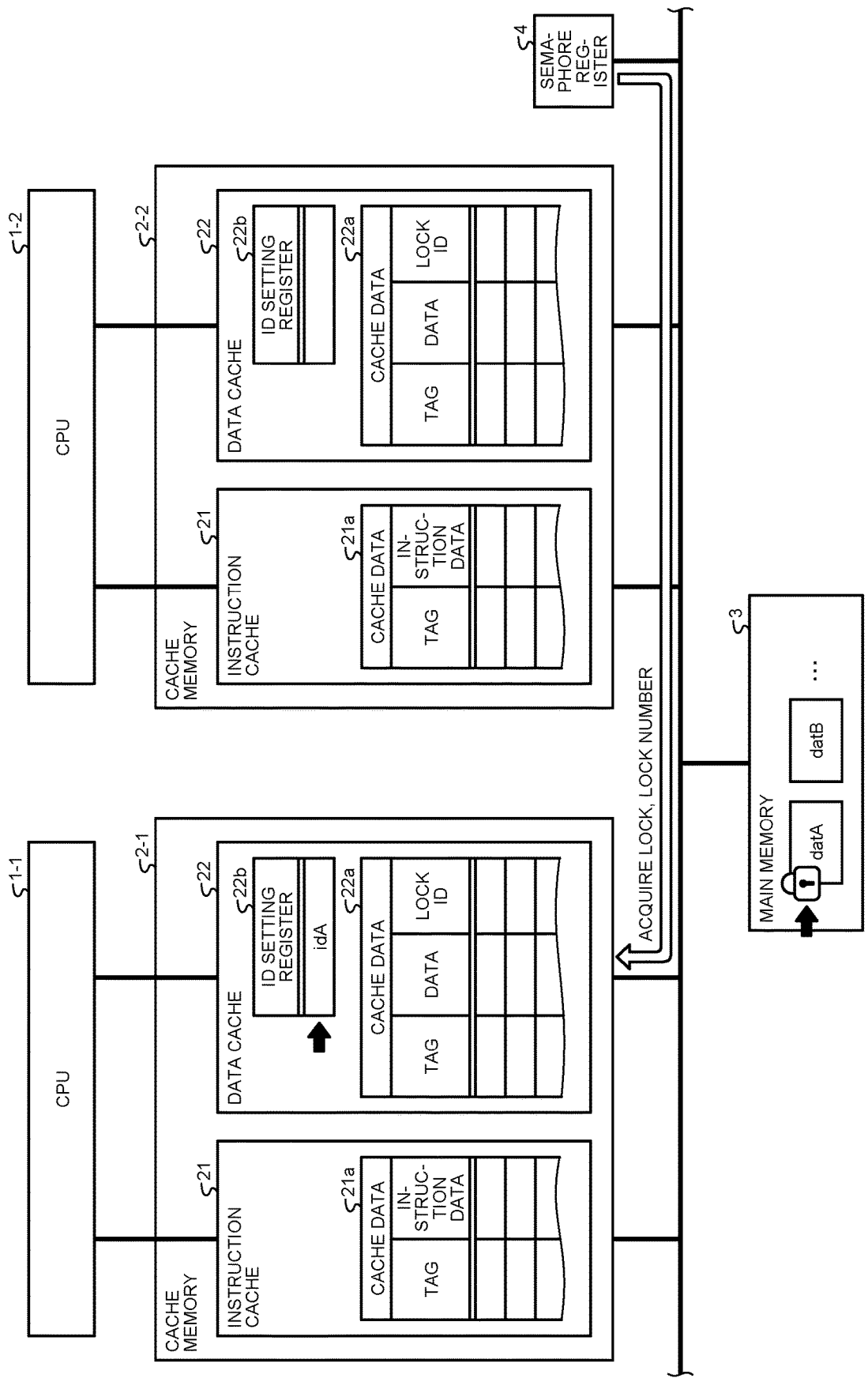
FIG. 2 is a view illustrating an example of an operation of the information processing device.

FIGS. 2 to 9 are views illustrating examples of an operation of the information processing device. FIG. 2 schematically illustrates that the CPU 1-1 acquires a lock and sets a lock ID. The CPU 1-1 acquires the lock for exclusively accessing the data datA in the main memory 3. As indicated by the white arrow, the CPU 1-1 acquires the lock from the semaphore register 4. A lock number is also acquired. The lock ID determined based on this lock number is referred to as a lock ID "idA". As indicated by the black arrow, the CPU 1-1 that has acquired the lock sets the lock ID "idA" to the ID setting register 22b of the cache memory 2-1. The data datA in the main memory 3 is locked to enable only the CPU 1-1 to access the data datA.

Figure 3:
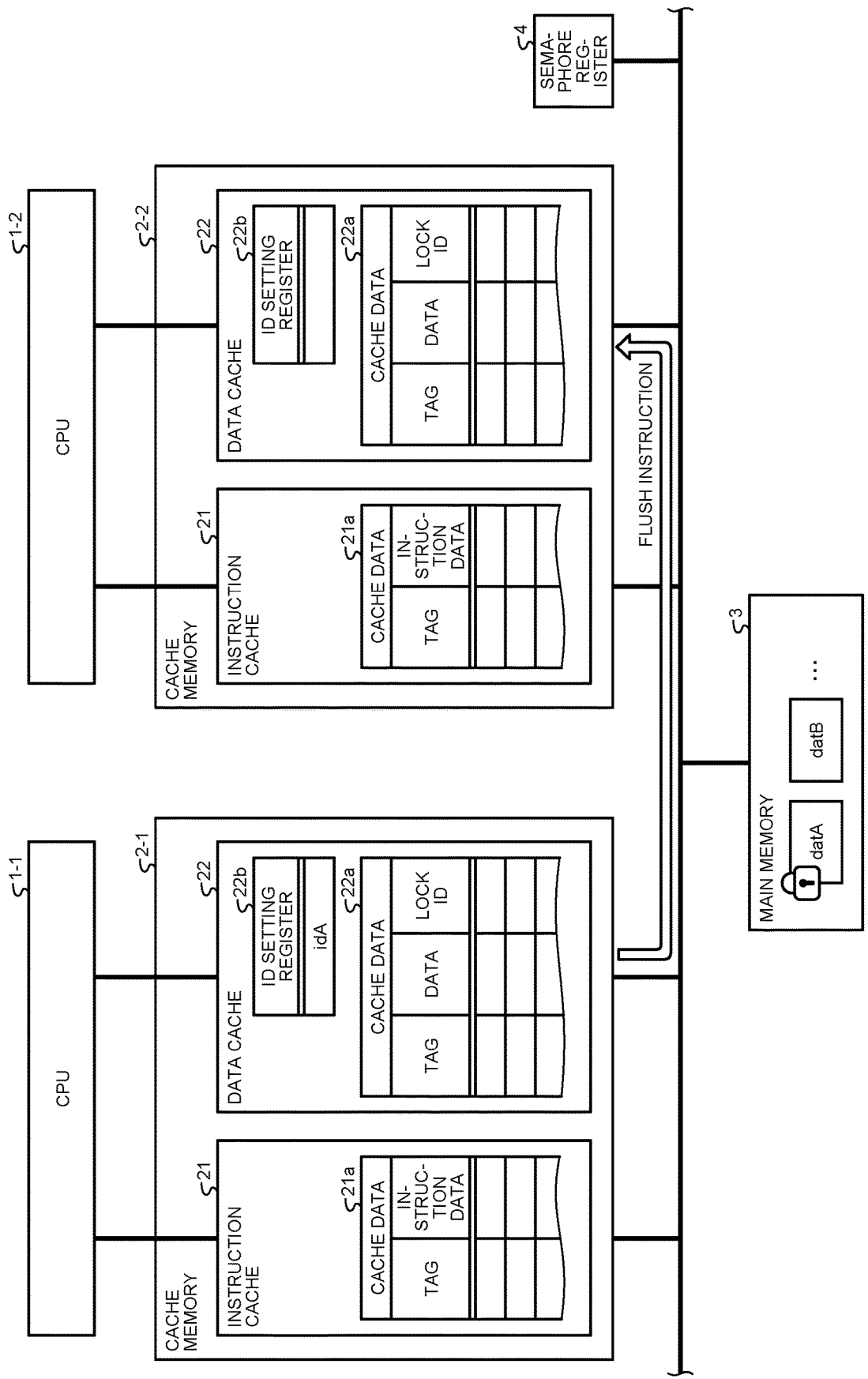
FIG. 3 is a view illustrating an example of the operation of the information processing device.

FIG. 3 schematically illustrates that the CPU 1-1 makes a flush instruction. The CPU 1-1 that has acquired the lock instructs the CPU 1 other than the own CPU, that is, the CPU 1-2 in this example to perform flushing. A flush instruction for giving an instruction on flushing is transmitted from the CPU 1-1 to the CPU 1-2. In this example, the flushing target is a cache line in which the same lock ID as the lock ID "idA" set to the ID setting register 22b of the cache memory 2-1 has been written. At a point of time in FIG. 3, there is no cache line in which the lock ID "idA" has been written in the data cache 22 of the cache memory 2-2 associated with the CPU 1-2. Hence, flushing is not performed.

Figure 4:
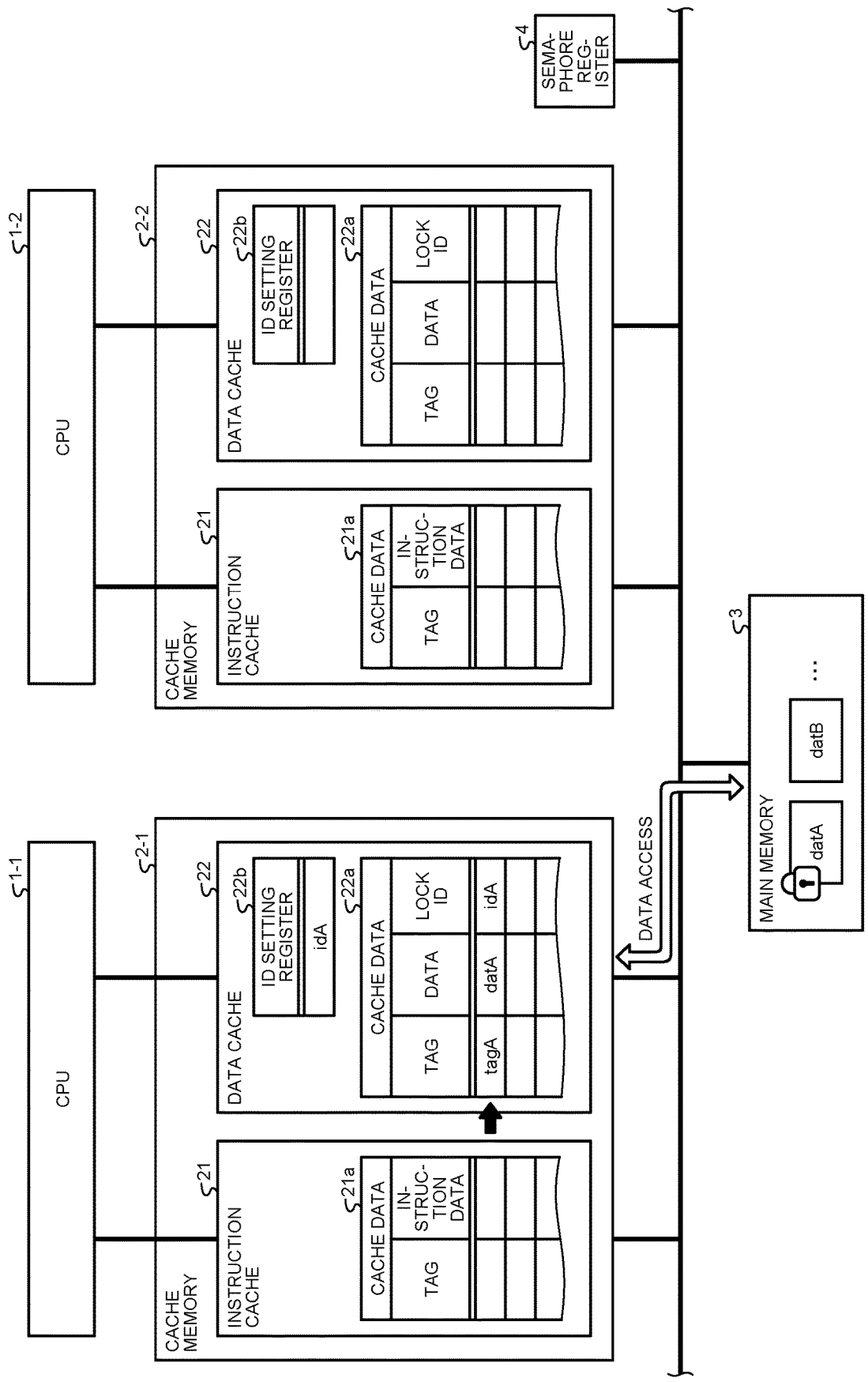
FIG. 4 is a view illustrating an example of the operation of the information processing device.

FIG. 4 schematically illustrates that the CPU 1-1 makes data access. As indicated by the white arrow, the CPU 1-1 accesses the data datA in the main memory 3. A tag "tagA" related to the access of the data datA, the data datA, and the lock ID "idA" are associated and written in the cache line of the data cache 22 of the cache memory 2-1.

Figure 5:
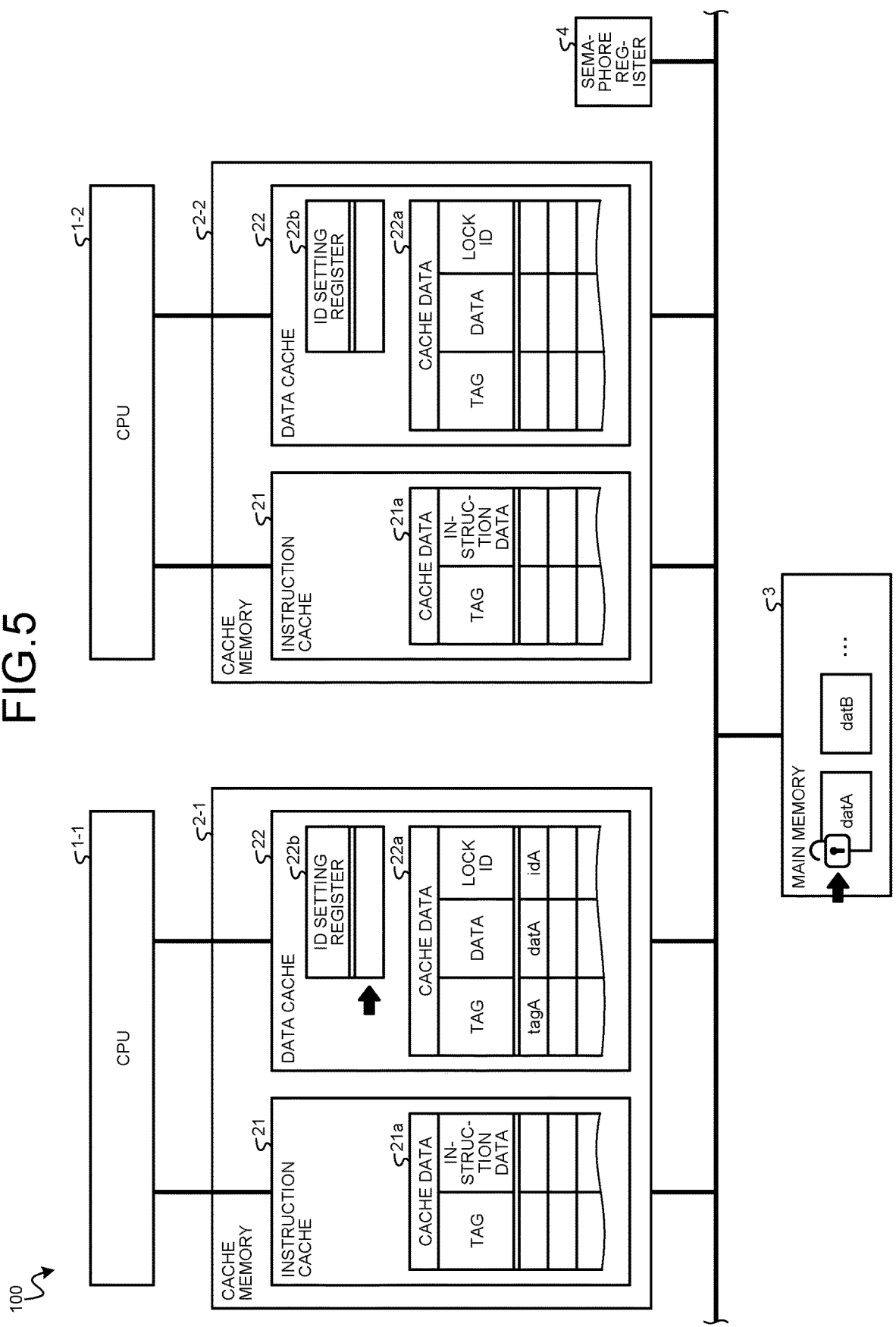
FIG. 5 is a view illustrating an example of the operation of the information processing device.

FIG. 5 schematically illustrates that the CPU 1-1 releases the lock. As indicated by the black arrow, the CPU 1-1 erases the lock ID (clears the value) set to the ID setting register 22b of the cache memory 2-1. The data datA in the main memory 3 is released to enable the arbitrary CPU 1 to acquire the lock and access the data datA.

Figure 6:
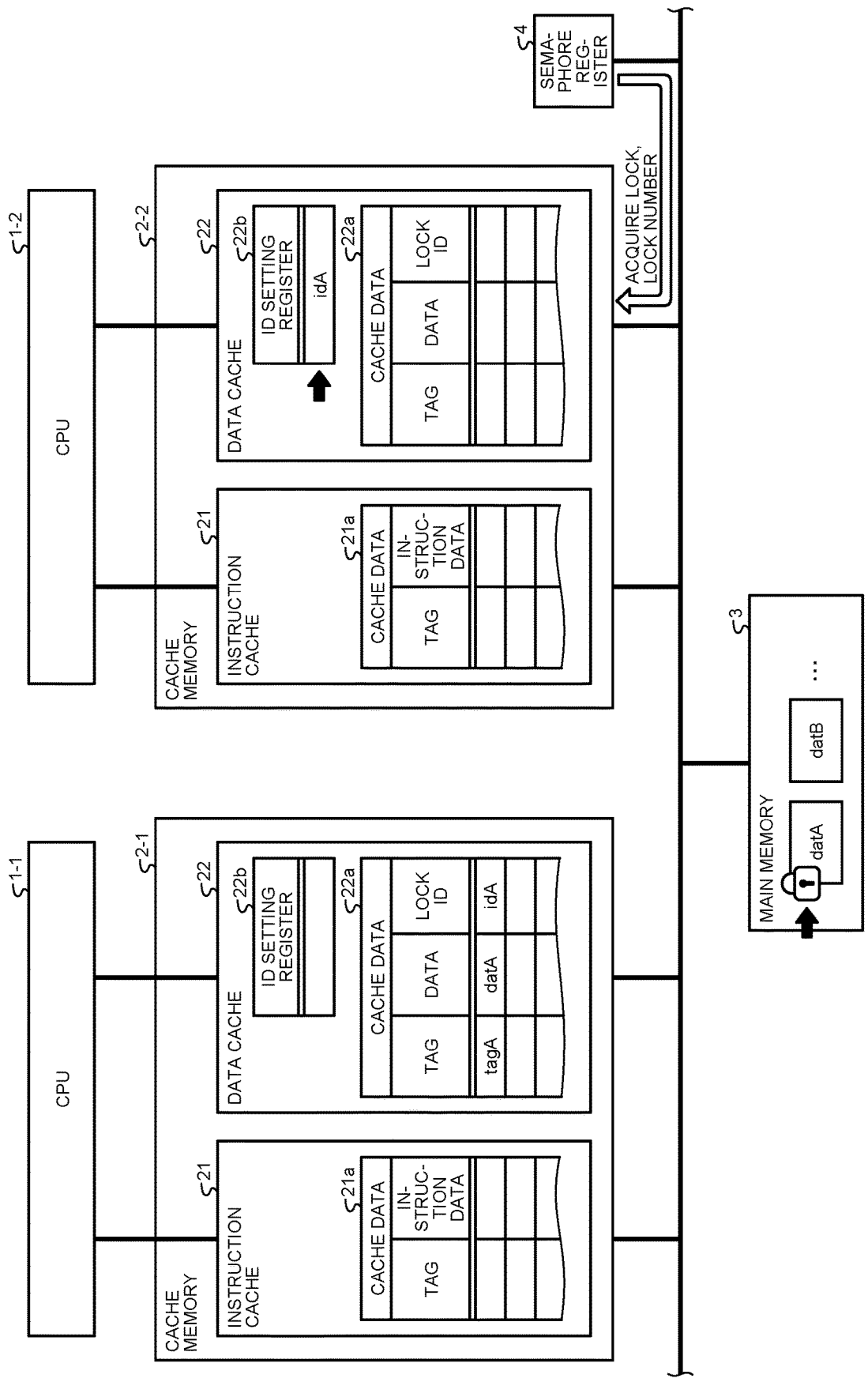
FIG. 6 is a view illustrating an example of the operation of the information processing device.

FIG. 6 schematically illustrates that the CPU 1-2 acquires the lock and sets a lock ID. The CPU 1-2 acquires the lock for exclusively accessing the data datA stored in the main memory 3. As indicated by the white arrow, the CPU 1-2 acquires the lock from semaphore register 4. A lock number is also acquired. The lock ID is the lock ID "idA" similar to the above. As indicated by the black arrow, the CPU 1-2 that has acquired the lock sets the lock ID "idA" to the ID setting register 22b of the cache memory 2-2. The data datA in the main memory 3 is locked to enable only the CPU 1-2 to access the data datA.

Figure 7:
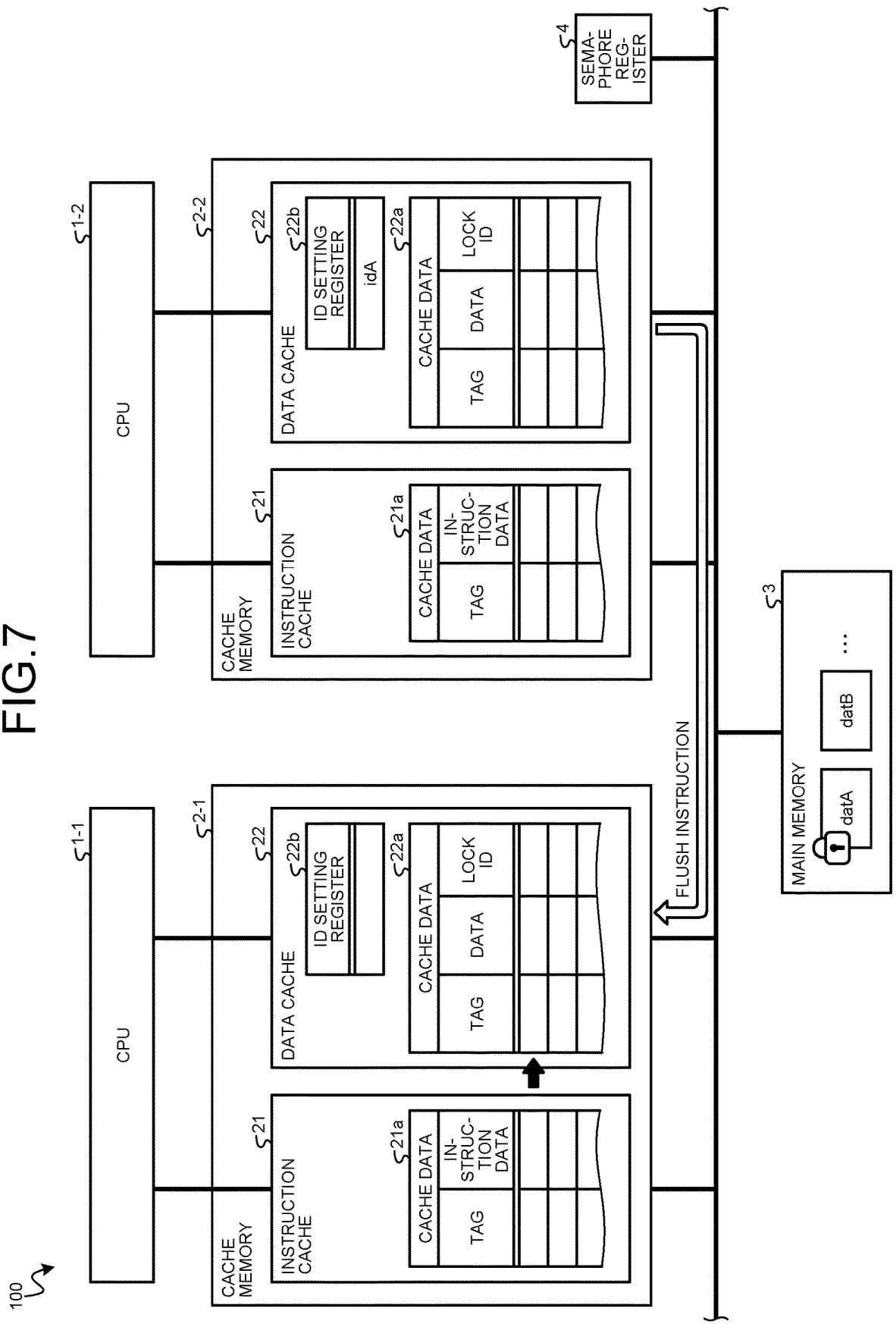
FIG. 7 is a view illustrating an example of the operation of the information processing device.

FIG. 7 schematically illustrates that the CPU 1-2 makes a flush instruction. The CPU 1-2 that has acquired the lock instructs the CPU 1 other than the own CPU, that is, the CPU 1-1 in this example to perform flushing. A flush instruction is transmitted from the CPU 1-2 to the CPU 1-1. In this example, the flushing target is a cache line in which the same lock ID as the lock ID "idA" set to the ID setting register 22b of the cache memory 2-2 has been written. The CPU 1-1 that has received the flush instruction flushes the cache line of the data cache 22 of the cache memory 2-1 in which the lock ID "idA" has been written as indicated by the black arrow.

Figure 8:
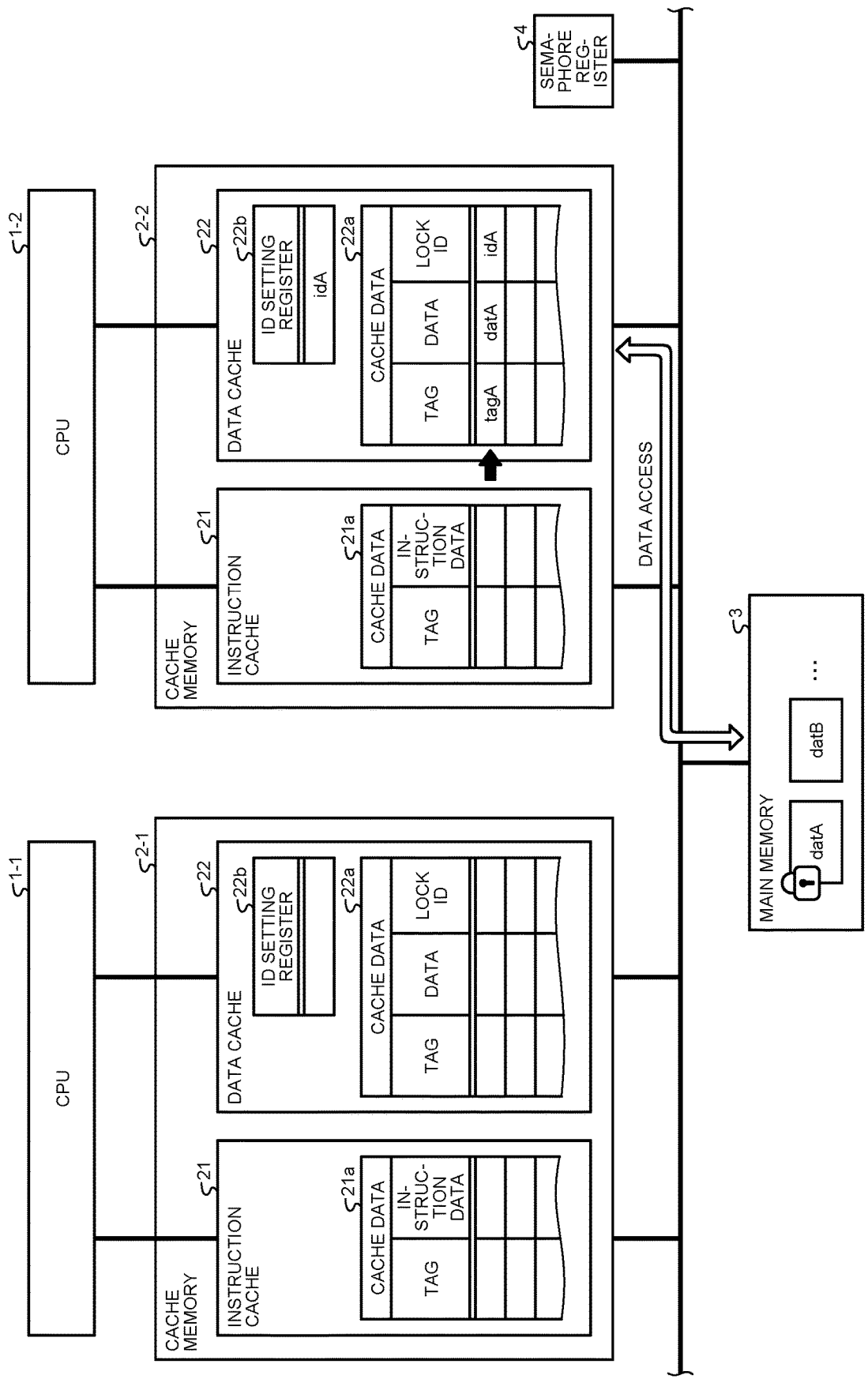
FIG. 8 is a view illustrating an example of the operation of the information processing device.

FIG. 8 schematically illustrates that the CPU 1-2 makes data access. As indicated by the white arrow, the CPU 1-2 accesses the data datA in the main memory 3. The tag "tagA" related to the access of the data datA, the data datA, and the lock ID "idA" are associated and written in the cache line of the data cache 22 of the cache memory 2-2.

Figure 9:
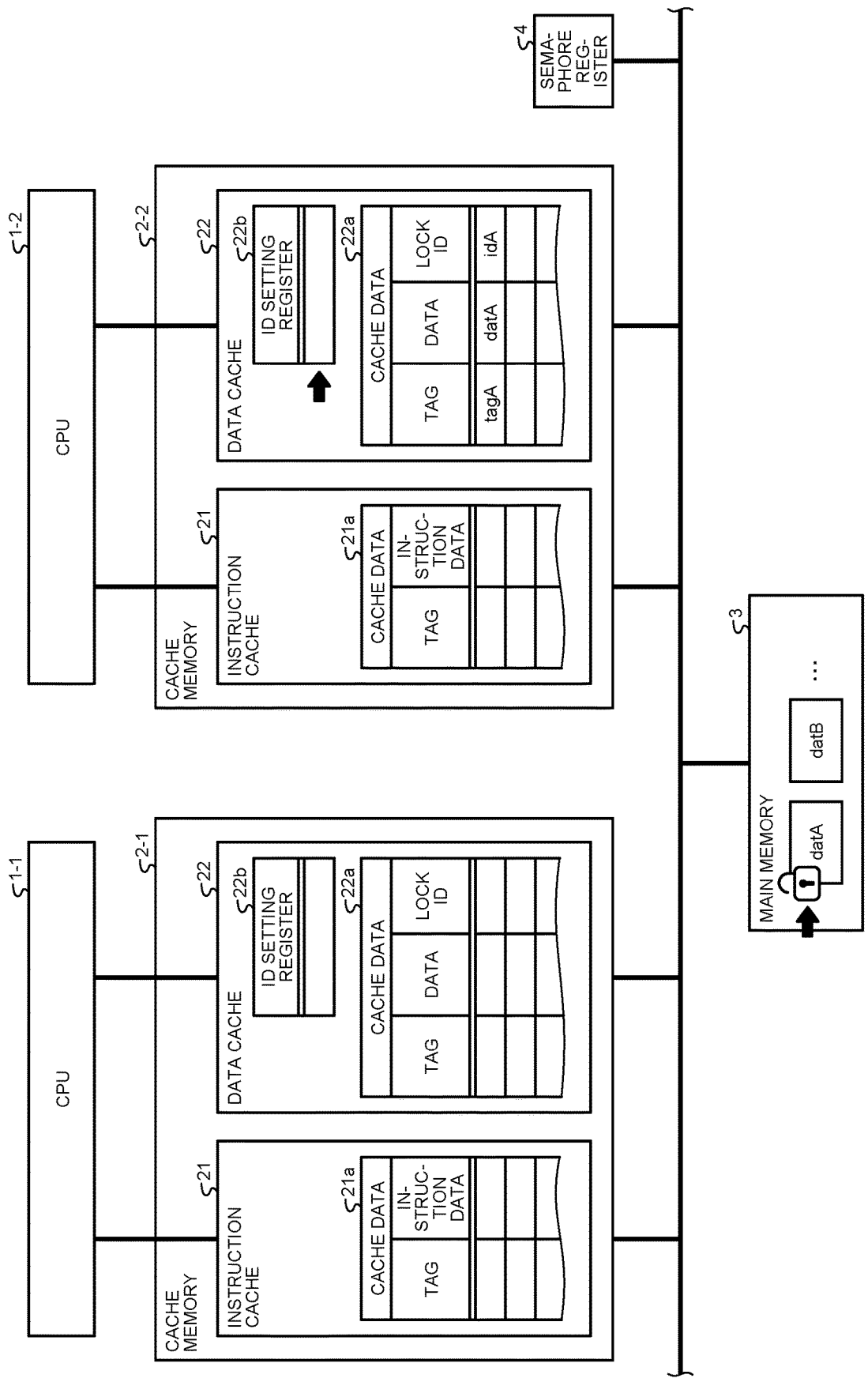
FIG. 9 is a view illustrating an example of the operation of the information processing device.

FIG. 9 schematically illustrates that the CPU 1-2 releases the lock. As indicated by the black arrow, the CPU 1-2 erases the lock ID set to the ID setting register 22b of the cache memory 2-2. The data datA in the main memory 3 is released to enable the arbitrary CPU 1 to acquire the lock and access the data datA.

For example, the cache line is flushed as described above. Even if the data datA in the main memory 3 is rewritten by the previous data access of the CPU 1-2, flushing is performed in advance, so that the data datA before rewriting does not remain in the cache memory 2-1 associated with the CPU 1-1. Thereafter, when the CPU 1-1 accesses the data datA, the CPU 1-1 makes data access to the main memory 3 instead of the cache memory 2-1, that is, accesses the rewritten data datA. Consequently, cache coherency is maintained.

In the information processing device 100, only the cache line in which the lock ID for specifying the lock has been written is flushed at a timing to acquire the lock before the data access. There is a higher possibility that it is possible to reduce a monitoring load and power consumption accompanying the monitoring load compared to, for example, a case where a snooping unit that constantly monitors data access is used. The information processing device 100 is suitable to mount on, for example, an Internet of Things (IOT) device or the like for which low power consumption is required.

Furthermore, when continuously accessing the same data, the same CPU 1 makes data access to the corresponding cache memory 2, so that it is still possible to speed up the data access that uses the cache memory 2.

Figure 10:
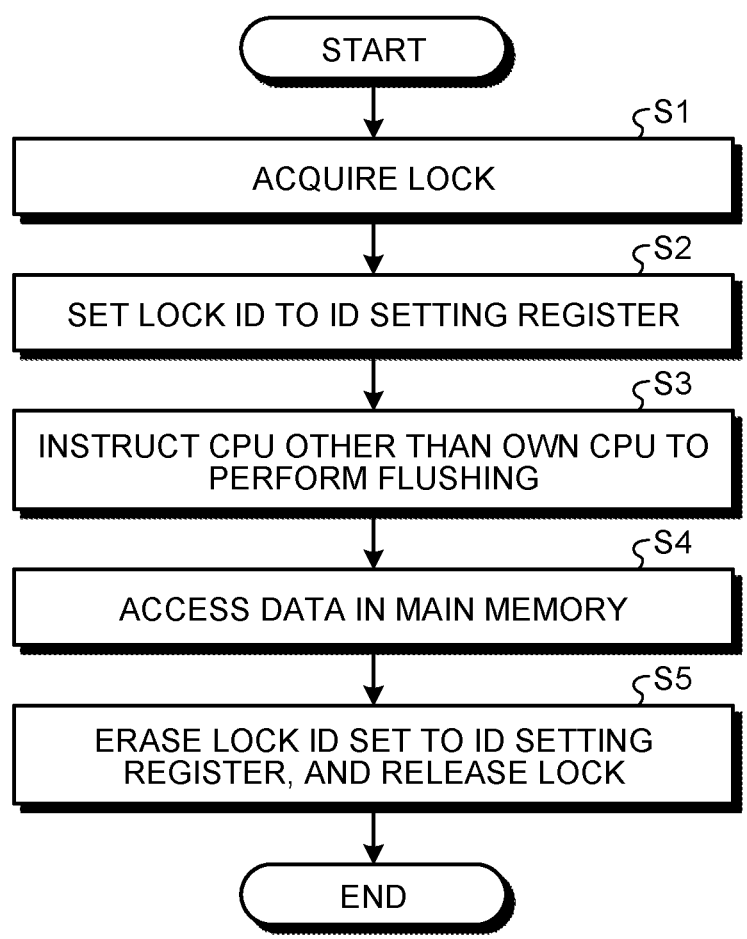
FIG. 10 is a flowchart illustrating an example of processing (information processing method) executed by the information processing device.

FIG. 10 is a flowchart illustrating an example of processing (information processing method) executed by the information processing device. FIG. 10 illustrates some processing executed from a start of data access to an end of the data access of one CPU 1. Description of contents that overlap those in the above description will be omitted as appropriate.

In Step S1, the CPU 1 acquires from the semaphore register 4 a lock for exclusively accessing data in the main memory 3.

In Step S2, the CPU 1 sets a lock ID for specifying the lock to the ID setting register 22b of the corresponding cache memory 2.

In Step S3, the CPU 1 instructs the CPU 1 other than the CPU 1 itself (own CPU) to perform flushing. The flushing target is a cache line in which, for example, the same lock ID as the lock ID set in previous Step S2 has been written. For example, a flush instruction is transmitted. The CPU 1 that has received the flush instruction flushes the cache line in which the same lock ID has been written among the cache lines of the data cache 22 of the corresponding cache memory 2.

In Step S4, the CPU 1 accesses data in the main memory 3. In response to the data access, a tag related to the access, the data, and the lock ID are associated and written in the cache line of the data cache 22.

In Step S5, the CPU 1 erases the lock ID set to the ID setting register 22b of the corresponding cache memory 2, and releases the lock.

2. Modified Example

The one embodiment of the disclosed technique has been described above. The disclosed technique is not limited to the above embodiment. Next, some modified examples will be described.

2.1 First Modified Example

Some processing may be executed by the semaphore register 4 instead of the CPU 1. Part of the processing is executed by the hardware (semaphore register 4), so that it is possible to reduce a processing load of software (CPU 1). For example, there is a higher possibility that it is possible to speed up processing.

Setting of a lock ID to the ID setting register 22b and a flush instruction to the CPU 1 may be made by the semaphore register 4 instead of the CPU 1. This will be described with reference to FIGS. 11 to 15.

Figure 11:
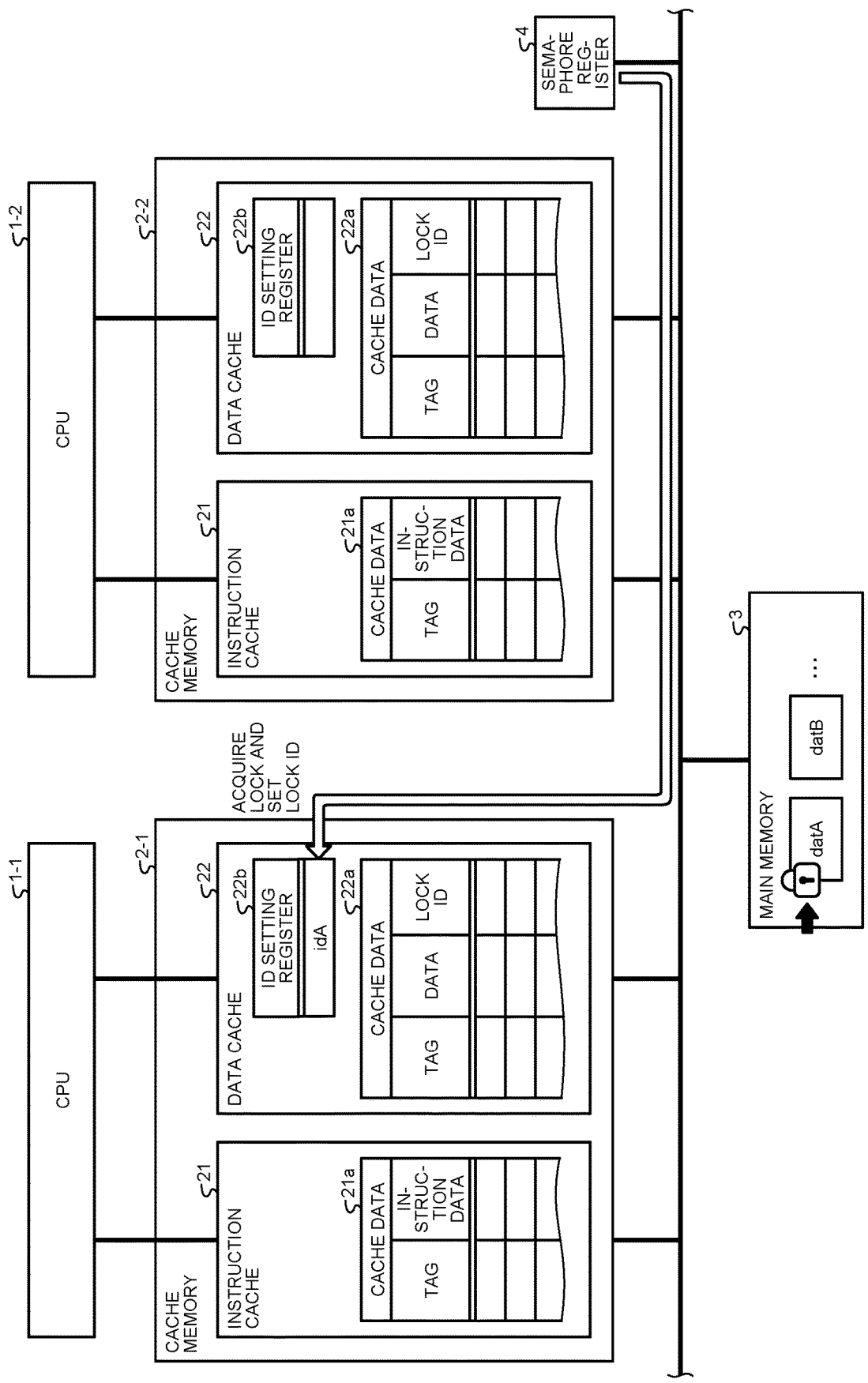
FIG. 11 is a view illustrating an example of the operation of the information processing device.

FIGS. 11 to 14 are views illustrating examples of the operation of the information processing device. FIG. 11 schematically illustrates that the CPU 1-1 acquires a lock and the semaphore register 4 sets a lock ID. Similarly to above-described FIG. 2, the CPU 1-1 acquires the lock for exclusively accessing the data datA stored in the main memory 3. A lock number is also acquired. On the other hand, in the example illustrated in FIG. 11, as indicated by the white arrow, not the CPU 1-1, but the semaphore register 4 sets the lock ID "idA" to the ID setting register 22b of the cache memory 2-1 associated with the CPU 1-1 that has acquired the lock.

Figure 12:
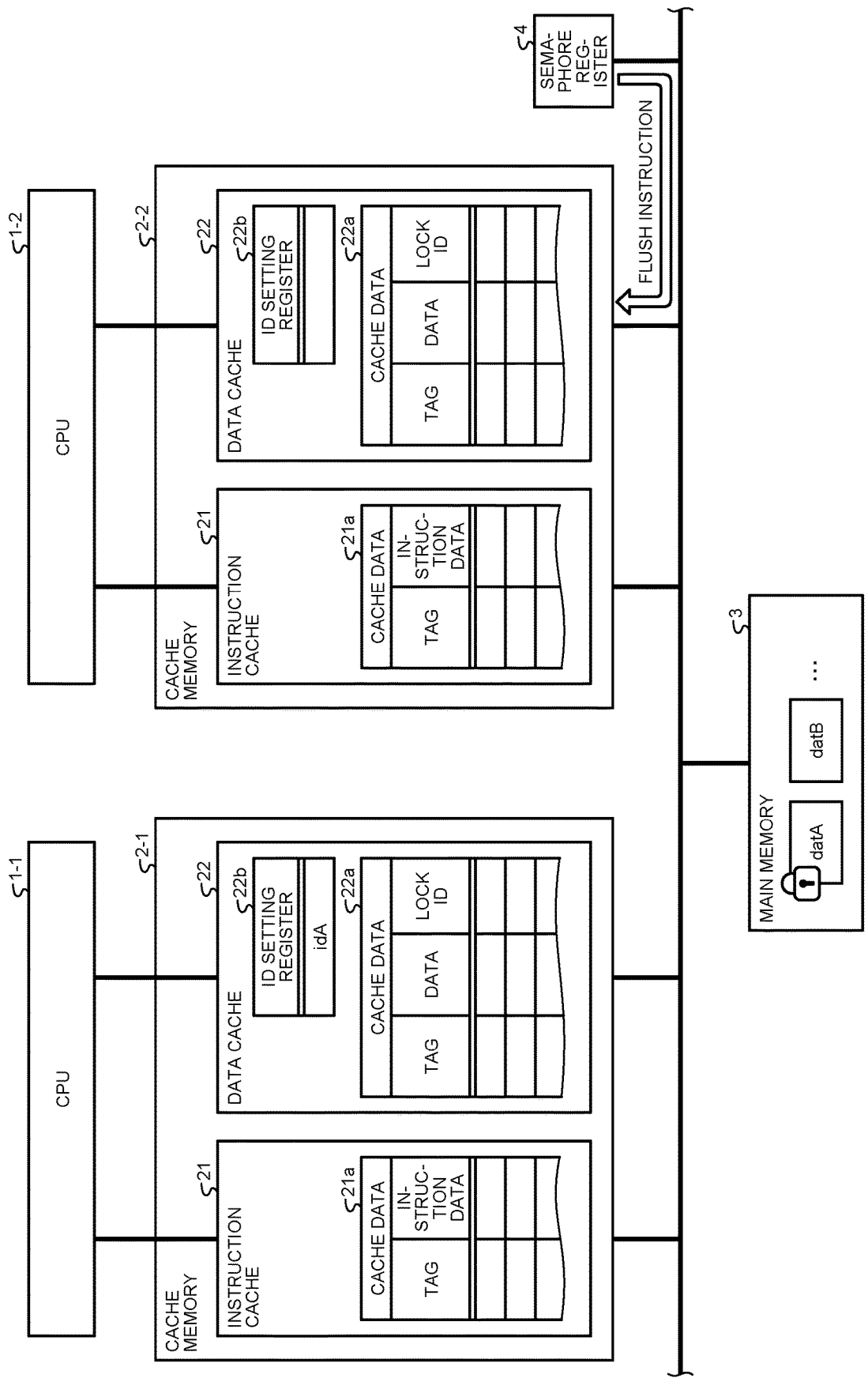
FIG. 12 is a view illustrating an example of the operation of the information processing device.

FIG. 12 schematically illustrates that the semaphore register 4 makes a flush instruction. Unlike above-described FIG. 3, in the example illustrated in FIG. 12, (not the CPU 1-1 that has acquired the lock, but) the semaphore register 4 instructs the CPU 1 other than the CPU 1-1 that has acquired the lock, that is, the CPU 1-2 in this example to perform flushing. The flush instruction is transmitted from the semaphore register 4 to the CPU 1-2. In this example, a flushing target is a cache line in which the same lock ID as the lock ID "idA" set to the ID setting register 22b of the cache memory 2-1 has been written. At a point of time in FIG. 12, there is no cache line in which the lock ID "idA" has been written in the data cache 22 of the cache memory 2-2 associated with the CPU 1-2. Hence, flushing is not performed.

Figure 13:
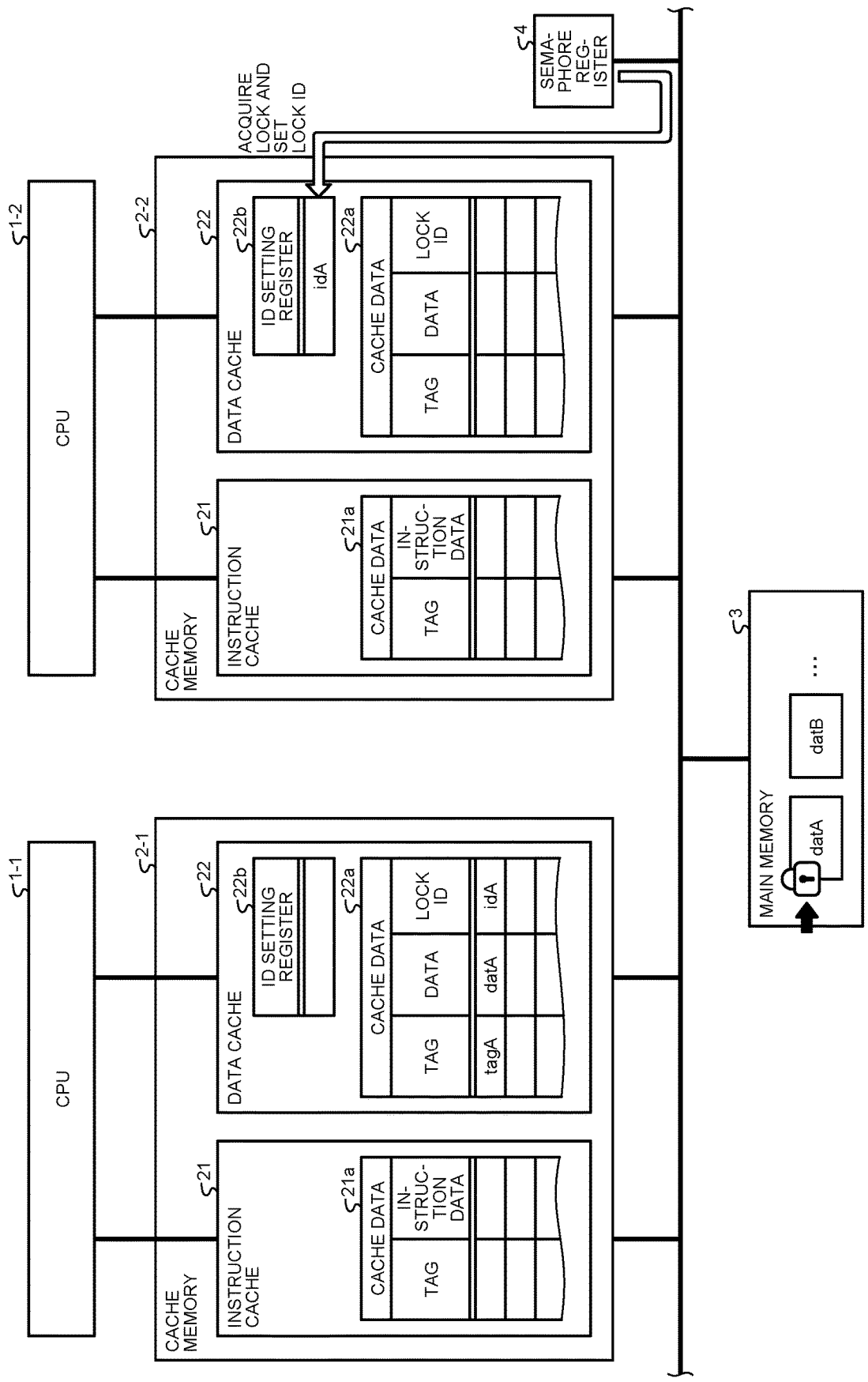
FIG. 13 is a view illustrating an example of the operation of the information processing device.

FIG. 13 schematically illustrates that the CPU 1-2 acquires a lock and the semaphore register 4 sets a lock ID. Similarly to above-described FIG. 6, the CPU 1-2 acquires the lock for exclusively accessing the data datA stored in the main memory 3. On the other hand, in the example illustrated in FIG. 13, as indicated by the white arrow, not the CPU 1-2, but the semaphore register 4 sets the lock ID "idA" to the ID setting register 22b of the cache memory 2-2 associated with the CPU 1-2.

Figure 14:
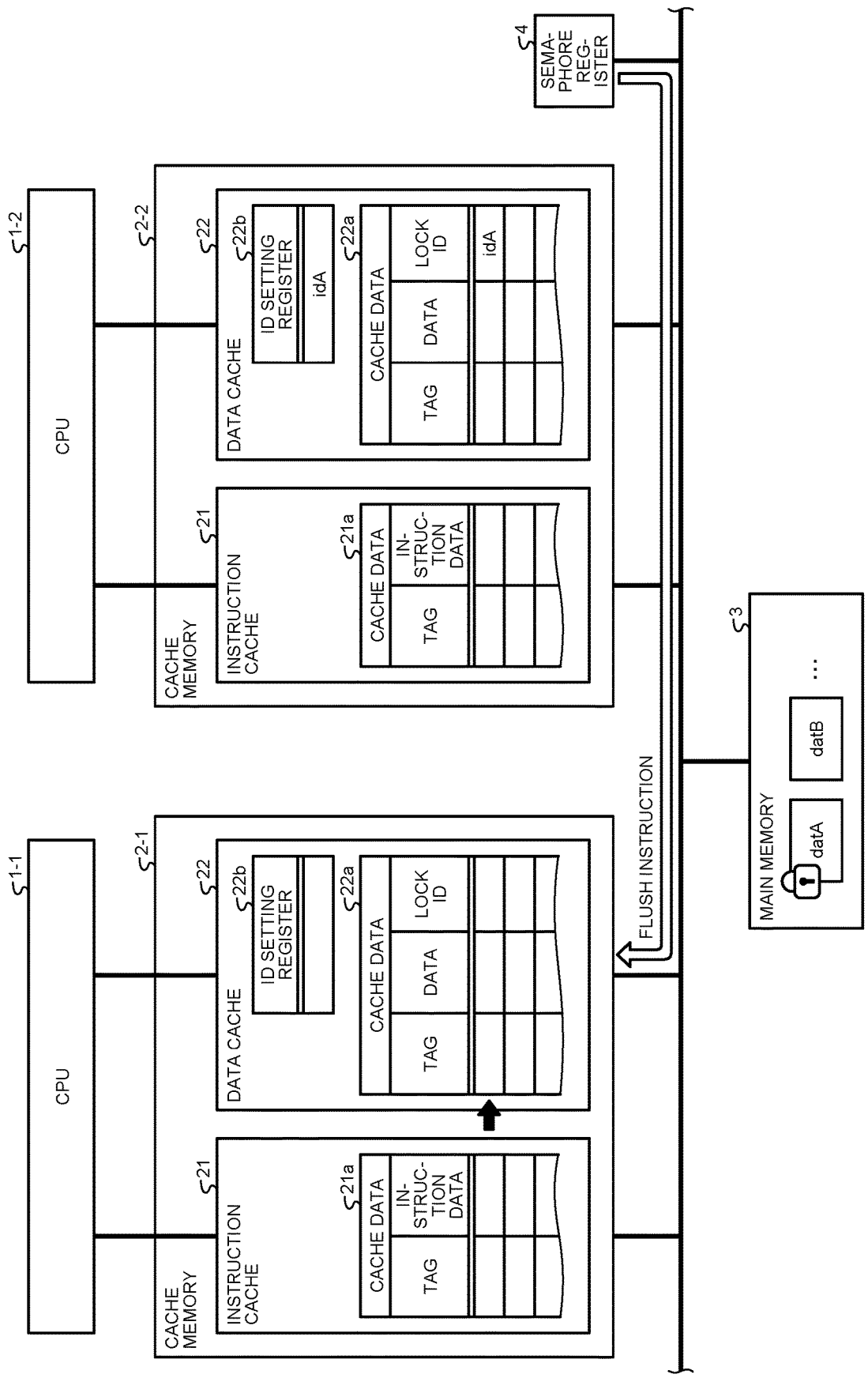
FIG. 14 is a view illustrating an example of the operation of the information processing device.

FIG. 14 schematically illustrates that the semaphore register 4 makes a flush instruction. Unlike above-described FIG. 7, in the example illustrated in FIG. 14, (not the CPU 1-2 that has acquired the lock, but) the semaphore register 4 instructs the CPU 1 other than the CPU 1-2 that has acquired the lock, that is, the CPU 1-1 in this example to perform flushing. A flush instruction is transmitted from the semaphore register 4 to the CPU 1-1. In this example, the flushing target is the cache line in which the same lock ID as the lock ID "idA" set to the ID setting register 22b of the cache memory 2-2 has been written. The CPU 1-1 that has received the flush instruction flushes the cache line of the data cache 22 of the cache memory 2-1 in which the lock ID "idA" has been written as indicated by the black arrow.

Figure 15:
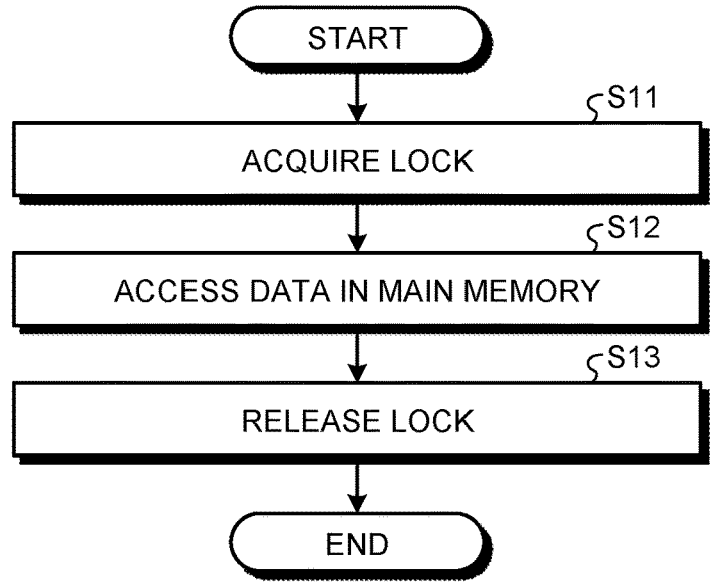
FIG. 15 is a flowchart illustrating an example of processing (information processing method) executed by the information processing device.

FIG. 15 is a flowchart illustrating an example of processing (information processing method) executed by the information processing device. FIG. 15 illustrates some processing executed by the CPU 1 from a start of data access to an end of the data access of the one CPU 1.

Processing in Step S11 is the same as Step S1 in above-described FIG. 10. The CPU 1 acquires from the semaphore register 4 the lock for exclusively accessing data in the main memory 3.

Although not illustrated in FIG. 15, the same processing as the processing in Steps S2 and S3 in above-described FIG. 10 is executed by the semaphore register 4. The semaphore register 4 sets the lock ID for specifying the lock to the ID setting register 22b of the cache memory 2 associated with the CPU 1 that has acquired the lock. The semaphore register 4 instructs the CPU 1 other than the CPU 1 to perform flushing.

Processing in Step S12 is the same as the processing in Step S4 in above-described FIG. 10. The CPU 1 accesses data in the main memory. In response to the data access, a tag related to the access, the data, and the lock ID are associated and written in the cache line of the data cache 22.

In Step S13, the CPU 1 releases the lock. Although not illustrated in FIG. 15, the semaphore register 4 erases the lock ID set to the ID setting register 22b of the cache memory 2 associated with this CPU 1.

2.2 Second Modified Example

To access a plurality of items of data in the main memory 3, a plurality of locks may be acquired. A lock ID is indicated as, for example, a bit field to specify a plurality of locks. This will be more specifically described with reference to FIG. 16.

Figure 16:
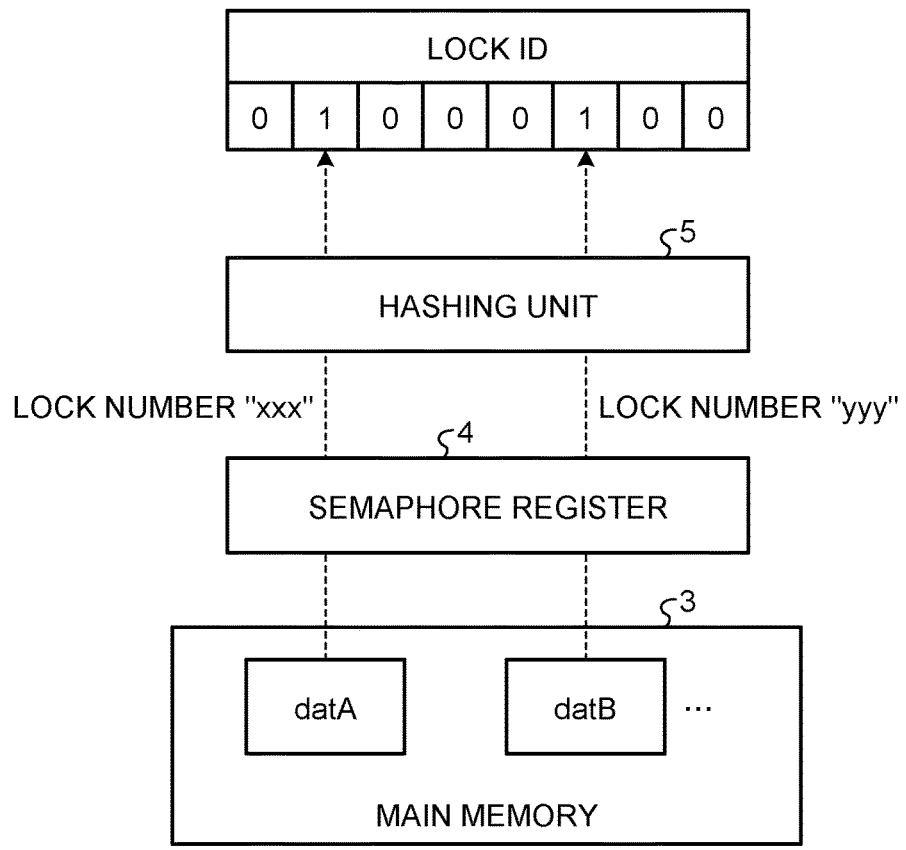
FIG. 16 is a view illustrating an example of a lock ID for specifying a plurality of locks.

FIG. 16 is a view illustrating an example of the lock ID for specifying the plurality of locks. The lock ID is indicated as the bit field including a plurality of bits. Note that the number of bits is eight in the example illustrated in FIG. 16, yet the number of bits may be set according to the number of locks or the like as appropriate.

Each of the plurality of bits indicates whether or not a corresponding lock has been acquired. In this example, a bit "1" indicates that the corresponding lock has been acquired. A bit "0" indicates that the corresponding lock has not been acquired. Such a bit field can also be referred to as a bit flag.

The plurality of locks are each associated with one bit of the plurality of bits based on a hash value of each lock number. For example, the lock is associated with a bit of a bit number determined based on a hash value of this lock number.

In the example illustrated in FIG. 16, a lock for exclusively accessing the data datA and a lock for exclusively accessing the data datB are acquired. The lock number of each lock is provided by semaphore register 4. The lock number associated with the data datA is schematically illustrated as a lock number "xxx". A lock number associated with the data datB is schematically illustrated as a lock number "yyy".

By hashing the lock number, the hashing unit 5 sets one bit in the bit field to "1" (turns on a flag). In this example, the hashing unit 5 sets the second bit to "1" by hashing the lock number "xxx". The hashing unit 5 sets the sixth bit to "1" by hashing the lock number "yyy". The bit field, that is, a lock ID "01000100" obtained in this way specifies two locks of the lock associated with the data datA and the lock associated with the data datB. According to the same principle, three or more locks can be also specified.

The lock ID for specifying the plurality of locks is set to the ID setting register 22b of the cache memory 2 as described above. The subject that makes the settings may be the above-described CPU 1 or semaphore register 4, or may be the hashing unit 5.

As a matter of course, the hashing unit 5 may be also a component of the information processing device 100. The hashing unit 5 may be provided separately from the CPU 1 and the semaphore register 4, or the function of the hashing unit 5 may be incorporated in the CPU 1 and the semaphore register 4.

As described above, an instruction on flushing of the cache line in which the lock ID associated with the lock ID of the lock acquired by the CPU 1 has been written is given. In a case where the lock ID specifies the plurality of locks as described above, the corresponding lock ID is an overlapping lock ID of at least part of locks among the plurality of locks to be specified. The cache line of each of the plurality of cache memories 2 is flushed when the CPU 1 other than the corresponding CPU 1 acquires at least one lock of the plurality of locks specified based on the lock ID written in the cache line. Consequently, even when a plurality of locks for accessing a plurality of items of data in the main memory 3 are acquired, it is possible to maintain cache coherency.

2.3 Others

In the above embodiment, the two CPUs 1 of the CPU 1-1 and the CPU 1-2 have been described as an example of the plurality of CPUs 1. However, the number of CPUs 1 may be three or more. The same applies to the number of the cache memories 2.

As is described above, various known exclusive control mechanisms other than the semaphore register 4 may be used as the exclusive control mechanism.

The information processing device 100 is mounted on, for example, an electronic device or the like and used. An example of the electronic device is a device such as an IOT device for which low power consumption is required. The electronic device on which the information processing device 100 is mounted is also one of the embodiments.

3. Example of Effect

The above-described technique is specified as follows, for example. One of the disclosed techniques is the information processing device 100. As described with reference to FIGS. 1 to 16, the information processing device 100 includes the plurality of CPUs 1, the plurality of cache memories 2 associated with the plurality of CPUs 1, and the main memory 3. Each of the plurality of CPUs 1 acquires a lock for exclusively accessing data (e.g., the data datA and the data datB) in the main memory 3, and then accesses the data. In the cache line (of the data cache 22) of each of the plurality of cache memories 2, the data related to the access of the corresponding CPU 1 and a lock ID for specifying the lock related to the access are associated and written. The cache line (of the data cache 22) of each of the plurality of cache memories 2 is flushed when the CPU 1 other than the corresponding CPU 1 acquires the lock specified based on the lock ID written in the cache line.

In the above information processing device 100, the data related to the access of the corresponding CPU 1 and the lock ID for specifying the lock related to the access are associated and written in the cache line. The cache line is flushed when the CPU 1 other than the corresponding CPU 1 acquires the lock specified based on the lock ID written in the cache line. By flushing the cache line based on the lock ID in this way, it is possible to maintain cache coherency.

According to the above information processing device 100, only the cache line in which the lock ID for specifying the lock has been written is flushed at a timing to acquire the lock before the data access. There is a higher possibility that it is possible to reduce power consumption compared to, for example, a case where a snooping unit that constantly monitors data access is used. The information processing device 100 may be mounted on, for example, an electronic device such as an IOT device for which low power consumption is required. There is a higher possibility that it is possible to reduce power consumption of the electronic device.

As described with reference to FIGS. 3, 7, 12, and 14, and the like, a flush instruction for giving an instruction on flushing of the cache line in which the lock ID associated with the lock ID of the lock acquired by the CPU 1 has been written may be transmitted to the CPU 1 other than the CPU 1 that has acquired the lock. For example, it is possible to give an instruction on flushing in this way.

As described with reference to FIGS. 1, 2, 4, 6, 8, 11, and 13, and the like, each of the plurality of cache memories 2 may include the ID setting register 22b to which the lock ID is set, and the lock ID set to the ID setting register 22b may be written in the cache line (of the data cache 22) of the same cache memory 2. By, for example, using this ID setting register 22b, it is possible to write the lock ID in the cache line.

As described with reference to FIGS. 2 and 6 and the like, the CPU 1 that has acquired the lock may set the lock ID to the ID setting register 22b of the corresponding cache memory 2. Furthermore, as described with reference to FIGS. 3 and 7 and the like, the CPU 1 that has acquired the lock may instruct the CPU 1 other than the own CPU to perform flushing. Consequently, it is possible to set the lock ID and make the flush instruction by software processing.

As described with reference to FIGS. 1, 11, and 13, and the like, the information processing device 100 may include an exclusive control mechanism (e.g., the semaphore register 4) that provides a lock, and the exclusive control mechanism may set the lock ID to the ID setting register 22b of the cache memory 2 associated with the CPU 1 that has acquired the lock. Furthermore, as described with reference to FIGS. 12 and 14 and the like, the exclusive control mechanism may instruct the CPU 1 other than the CPU 1 that has acquired the lock to perform flushing. Consequently, it is possible to set the lock ID and make the flush instruction by hardware processing.

As described with reference to FIG. 16 and the like, the lock ID may be indicated as a bit field including a plurality of bits to specify a plurality of locks, and each of the plurality of bits may indicate whether or not a corresponding lock of the plurality of locks has been acquired. In this case, the plurality of locks may be associated with one bit of the plurality of bits based on a hash value of each lock number. Consequently, even when a plurality of locks for accessing a plurality of items of data in the main memory 3 are acquired, it is possible to maintain cache coherency.

The information processing method described with reference to FIGS. 10 and 15 and the like is also one of the disclosed techniques. The information processing method includes at each of the plurality of CPUs 1, acquiring a lock for exclusively accessing data (e.g., the data datA and the data datB) in the main memory 3, and then accessing the data (e.g., in Steps S1, S4, S11, and S12), associating and writing data related to the access of the corresponding CPU 1 and a lock ID for specifying the lock related to the access in a cache line of each of the plurality of cache memories 2 associated with the plurality of CPUs 1 (e.g., Steps S4 and S12), and flushing the cache line of each of the plurality of cache memories 2 when the CPU 1 other than the corresponding CPU 1 acquires the lock specified based on the lock ID written in the cache line (e.g., Step S3). This information processing method can also maintain cache coherency as described above.

Note that the effect described in the present disclosure is merely an example, and is not limited to the disclosed contents. There may be other effects.

Although the embodiment of the present disclosure has been described above, the technical scope of the present disclosure is not limited to the above-described embodiment as is, and various modifications can be made without departing from the gist of the present disclosure. Furthermore, components according to different embodiments and modified examples may be combined as appropriate.

Note that the technique according to the present disclosure can also employ the following configurations.

(1) An information processing device comprising:
a plurality of CPUs;
a plurality of cache memories associated with the plurality of CPUs; and
a main memory, wherein
each of the plurality of CPUs acquires a lock for exclusively accessing data in the main memory, and then accesses the data,
data related to the access of a corresponding CPU and a lock ID for specifying the lock related to the access are associated and written in a cache line of each of the plurality of cache memories, and
the cache line of each of the plurality of cache memories is flushed when a CPU other than the corresponding CPU acquires the lock specified based on the lock ID written in the cache line.

(2) The information processing device according to (1), wherein a flush instruction for giving an instruction on flushing of the cache line in which the lock ID associated with the lock ID of the lock acquired by the CPU has been written is transmitted to the CPU other than the CPU that has acquired the lock.

(3) The information processing device according to (1) or (2), wherein
each of the plurality of cache memories includes an ID setting register to which a lock ID is set, and
the lock ID set to the ID setting register is written in a cache line of a same cache memory.

(4) The information processing device according to (3), wherein
the CPU that has acquired the lock sets the lock ID to the ID setting register of a corresponding cache memory.

(5) The information processing device according to any one of (1) to (4), wherein
the CPU that has acquired the lock instructs the CPU other than the own CPU to perform the flushing.

(6) The information processing device according to (3), or (5) that recites (3), further comprising
an exclusive control mechanism that provides a lock, wherein
the exclusive control mechanism sets the lock ID to the ID setting register of a cache memory associated with the CPU that has acquired the lock.

(7) The information processing device according to any one of (1) to (4) and (6), further comprising
an exclusive control mechanism that provides a lock, wherein
the exclusive control mechanism instructs the CPU other than the CPU that has acquired the lock to perform the flushing.

(8) The information processing device according to any one of (1) to (7), wherein
the lock ID is indicated in a bit field including a plurality of bits so as to specify a plurality of locks, and
each of the plurality of bits indicates whether or not a corresponding lock of the plurality of locks has been acquired.

(9) The information processing device according to any one of (8), wherein
the plurality of locks are associated with one bit of the plurality of bits based on a hash value of each lock number.

(10) The information processing device according to any one of (1) to (9), wherein the information processing device is mounted on an electronic device.

(11) An information processing method comprising:
at each of a plurality of CPUs, acquiring a lock for exclusively accessing data in a main memory, and then accessing the data;
associating and writing data related to the access of a corresponding CPU and a lock ID for specifying the lock related to the access in a cache line of each of a plurality of cache memories associated with the plurality of CPUs; and
flushing the cache line of each of the plurality of cache memories when a CPU other than the corresponding CPU acquires the lock specified based on the lock ID written in the cache line.

REFERENCE SIGNS LIST

1 CPU
2 CACHE MEMORY
21 INSTRUCTION CACHE
21a CACHE DATA
22 DATA CACHE
22a CACHE DATA
22b ID SETTING REGISTER
3 MAIN MEMORY
4 SEMAPHORE REGISTER (EXCLUSIVE CONTROL MECHANISM)
5 HASHING UNIT
100 INFORMATION PROCESSING DEVICE

The invention claimed is:
1. An information processing device comprising:
a plurality of CPUs;
a plurality of cache memories associated with the plurality of CPUs; and
a main memory, wherein
each of the plurality of CPUs acquires a lock for exclusively accessing data in the main memory, and then accesses the data,
data related to the access of a corresponding CPU and a lock ID for specifying the lock related to the access are associated and written in a cache line of each of the plurality of cache memories, and
the cache line of each of the plurality of cache memories is flushed when a CPU other than the corresponding CPU acquires the lock specified based on the lock ID written in the cache line.

2. The information processing device according to claim 1, wherein a flush instruction for giving an instruction on flushing of the cache line in which the lock ID associated with the lock acquired by the CPU has been written is transmitted to the CPU other than the CPU that has acquired the lock.

3. The information processing device according to claim 1, wherein
 each of the plurality of cache memories includes an ID setting register to which a lock ID is set, and
 the lock ID set to the ID setting register is written in a cache line of a same cache memory.

4. The information processing device according to claim 3, wherein the CPU that has acquired the lock sets the lock ID to the ID setting register of a corresponding cache memory.

5. The information processing device according to claim 1, wherein the CPU that has acquired the lock instructs another CPU to perform the flushing.

6. The information processing device according to claim 3, further comprising
 an exclusive control mechanism that provides a lock, wherein
 the exclusive control mechanism sets the lock ID to the ID setting register of a cache memory associated with the CPU that has acquired the lock.

7. The information processing device according to claim 1, further comprising
 an exclusive control mechanism that provides a lock, wherein
 the exclusive control mechanism instructs the CPU other than the CPU that has acquired the lock to perform the flushing.

8. The information processing device according to claim 1, wherein
 the lock ID is indicated in a bit field including a plurality of bits so as to specify a plurality of locks, and
 each of the plurality of bits indicates whether or not a corresponding lock of the plurality of locks has been acquired.

9. The information processing device according to claim 8, wherein the plurality of locks are associated with one bit of the plurality of bits based on a hash value of each lock number.

10. The information processing device according to claim 1, wherein the information processing device is mounted on an electronic device.

11. An information processing method comprising:
 at each of a plurality of CPUs, acquiring a lock for exclusively accessing data in a main memory, and then accessing the data;
 associating and writing data related to the access of a corresponding CPU and a lock ID for specifying the lock related to the access in a cache line of each of a plurality of cache memories associated with the plurality of CPUs; and
 flushing the cache line of each of the plurality of cache memories when a CPU other than the corresponding CPU acquires the lock specified based on the lock ID written in the cache line.

12. The information processing method according to claim 11, wherein a flush instruction for giving an instruction on flushing of the cache line in which the lock ID associated with the lock acquired by the CPU has been written is transmitted to the CPU other than the CPU that has acquired the lock.

13. The information processing method according to claim 11, wherein
 each of the plurality of cache memories includes an ID setting register to which a lock ID is set, and
 the lock ID set to the ID setting register is written in a cache line of a same cache memory.

14. The information processing method according to claim 13, wherein the CPU that has acquired the lock sets the lock ID to the ID setting register of a corresponding cache memory.

15. The information processing method according to claim 11, wherein the CPU that has acquired the lock instructs another CPU to perform the flushing.

16. The information processing method according to claim 13, further comprising:
 providing, by an exclusive control mechanism, a lock, wherein the exclusive control mechanism sets the lock ID to the ID setting register of a cache memory associated with the CPU that has acquired the lock.

17. The information processing method according to claim 11, further comprising
 providing, by an exclusive control mechanism, a lock, wherein the exclusive control mechanism instructs the CPU other than the CPU that has acquired the lock to perform the flushing.

18. The information processing method according to claim 11, wherein
 the lock ID is indicated in a bit field including a plurality of bits so as to specify a plurality of locks, and
 each of the plurality of bits indicates whether or not a corresponding lock of the plurality of locks has been acquired.

19. The information processing method according to claim 18, wherein the plurality of locks are associated with one bit of the plurality of bits based on a hash value of each lock number.

* * * * *